(12) United States Patent
Podgurski

(10) Patent No.: US 9,994,310 B2
(45) Date of Patent: Jun. 12, 2018

(54) ROTOR ASSEMBLY APPARATUS

(71) Applicant: The Boeing Company, Chicago, IL (US)

(72) Inventor: Daniel M. Podgurski, West Chester, PA (US)

(73) Assignee: The Boeing Company, Chicago, IL (US)

( * ) Notice: Subject to any disclaimer, the term of this patent is extended or adjusted under 35 U.S.C. 154(b) by 596 days.

(21) Appl. No.: 14/570,709

(22) Filed: Dec. 15, 2014

(65) Prior Publication Data

US 2016/0167777 A1 Jun. 16, 2016

(51) Int. Cl.
| | |
|---|---|
| *B64C 27/37* | (2006.01) |
| *B64C 27/605* | (2006.01) |
| *F01D 7/00* | (2006.01) |
| *B64C 27/59* | (2006.01) |
| *B64C 27/72* | (2006.01) |
| *B64C 27/00* | (2006.01) |

(52) U.S. Cl.
CPC ............. *B64C 27/37* (2013.01); *B64C 27/59* (2013.01); *B64C 27/605* (2013.01); *B64C 27/72* (2013.01); *F01D 7/00* (2013.01); *B64C 2027/004* (2013.01); *B64C 2027/7222* (2013.01); *Y02T 50/34* (2013.01)

(58) Field of Classification Search
CPC ......... B64C 27/37; B64C 27/59; B64C 27/72; B64C 27/605; B64C 27/80; B64C 2027/004; B64C 2027/7222; B64C 11/32; B64C 11/36; Y02T 50/34; F01D 7/00; F01D 7/02; F01D 416/155; F03D 7/0224
See application file for complete search history.

(56) References Cited

U.S. PATENT DOCUMENTS

| | | |
|---|---|---|
| 2,020,366 A | 11/1935 | MacCallum |
| 2,475,121 A | 7/1949 | Avery |
| 2,584,663 A | 2/1952 | Bensen |
| 3,591,109 A | 7/1971 | McLarty |
| 4,227,856 A | 10/1980 | Verrill et al. |
| 4,364,708 A | 12/1982 | David |
| 4,573,873 A | 3/1986 | Yao et al. |
| 4,953,098 A | 8/1990 | Fischer, Jr. et al. |

(Continued)

FOREIGN PATENT DOCUMENTS

GB 2464678 4/2010

OTHER PUBLICATIONS

European Patent Office, "Extended European Search Report," issued in connection with European Patent Application No. 15188930.0, dated May 4, 2016, 9 pages.

(Continued)

*Primary Examiner* — Jason Shanske
*Assistant Examiner* — Jesse Prager
(74) *Attorney, Agent, or Firm* — Hanley, Flight & Zimmerman, LLC

(57) ABSTRACT

Rotor assembly apparatus are disclosed. An example rotor assembly includes a twist actuator to drive a first rotation of a first shaft about a first axis, the twist actuator positioned at a center of rotation of the rotor assembly; and a first gear assembly to convert the first rotation into a plurality of second rotations of a plurality of second shafts, each of the second shafts to provide torque to a respective blade coupled to the rotor assembly.

19 Claims, 11 Drawing Sheets

(56) References Cited

U.S. PATENT DOCUMENTS

| | | | | |
|---|---|---|---|---|
| 5,242,265 | A | * | 9/1993 | Hora ...................... B64C 11/32 |
| | | | | 416/129 |
| 5,470,199 | A | * | 11/1995 | Schafer ................ F03B 13/105 |
| | | | | 415/129 |
| 5,624,232 | A | | 4/1997 | Certain |
| 6,231,005 | B1 | | 5/2001 | Costes |
| 7,674,091 | B2 | | 3/2010 | Zierten |
| 2010/0150702 | A1 | * | 6/2010 | Sheridan ................... F01D 5/06 |
| | | | | 415/170.1 |
| 2014/0154074 | A1 | | 6/2014 | Zientek et al. |
| 2016/0090177 | A1 | | 3/2016 | Gunter et al. |

OTHER PUBLICATIONS

United States Patent and Trademark Office, "Non-final Office Action," issued in connection with U.S. Appl. No. 14/502,655, dated May 25, 2017, 34 pages.

Straub et al., "Application of Higher Harmonic Blade Feathering on the OH-6A Helicopter for Vibration Reduction," 1986, 196 pages, NASA.

U.S. Appl. No. 14/502,655, filed Sep. 30, 2014, 50 pages.

United States Patent and Trademark Office, "Non-final Office Action," issued in connection with U.S. Appl. No. 14/502,655, dated Nov. 1, 2017, 11 pages.

* cited by examiner

ROTOR ASSEMBLY APPARATUS

GOVERNMENT LICENSE RIGHTS

This disclosure was made with Government support under Contract No. W911W6-11-2-0002. The Government of the United States may have certain rights in this disclosure.

FIELD

The present disclosure relates generally to aircraft and, more particularly, to rotor assembly apparatus.

BACKGROUND

Rotorcraft employ one or more blades coupled to a rotor. The rotor drives a rotation of the blades. An ability to manipulate certain characteristics of the blades, such as collective pitch and cyclic pitch, enables an operator to control movement of the rotorcraft.

SUMMARY

An example disclosed rotor assembly includes a twist actuator to drive a first rotation of a first shaft about a first axis, the twist actuator positioned at a center of rotation of the rotor assembly; and a first gear assembly to convert the first rotation into a plurality of second rotations of a plurality of second shafts, each of the second shafts to provide torque to a respective blade coupled to the rotor assembly.

An example disclosed apparatus includes a carrier coupled to a drive shaft, the drive shaft extending through a pitch shaft of a rotor assembly, the drive shaft providing a first amount of torque to the carrier; a first stage planetary gear system disposed in the carrier, the carrier to drive rotation of the first stage planetary gear system; a second stage planetary gear system disposed in the carrier, the first stage planetary gear system to drive rotation of the second stage planetary gear system; and an output of the second stage planetary gear system to provide a second amount of torque to a blade.

An example disclosed apparatus includes a first gear assembly to convert torque about a first axis provided by a central actuator of a rotor assembly into second torques about second axes, the second axes being different than the first axis, the first gear assembly comprising a first angled gear concentric with a first drive shaft of the central actuator; and second angled gears, each of the second angled gears to mesh with the first angled gear; and a second gear assembly to receive one of the second torques about one of the second axes via a second drive shaft, the second gear assembly comprising a first planetary gear system driven by the second drive shaft; and a second planetary gear system driven by the first planetary gear system, the second planetary gear system comprising a sun gear coupled to an output shaft.

The features, functions and advantages that have been discussed can be achieved independently in various embodiments or may be combined in yet other embodiments further details of which can be seen with reference to the following description and drawings.

Figure 1:
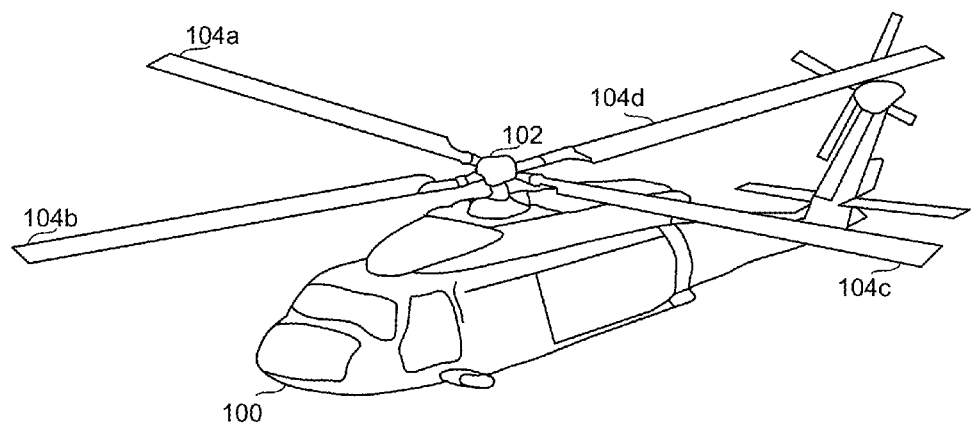
FIG. 1 is an illustration of an example rotorcraft in which teachings of this disclosure may be implemented.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. As used herein, the terms "coupled" and "operatively coupled" are defined as connected directly or indirectly (e.g., through one or more intervening structures and/or layers). Stating that any part is in contact with another part means that there is no intermediate part between the two parts.

DESCRIPTION

FIG. 1 shows an example machine in which example methods and apparatus disclosed herein may be utilized. While example methods and apparatus disclosed herein are described in connection with FIG. 1, examples disclosed herein may be implemented in connection with any type of machine or device having rotor blades, such as aircraft, watercraft, hovercraft, wind turbines, etc. FIG. 1 shows a helicopter 100 having a rotor system 102 that drives a plurality of rotor blades 104. The rotor system 102 spins the blades 104 to provide the helicopter 100 with lift and thrust. As the blades 104 spin through air, each of the blades 104 rotates along a tracking path or plane of rotation. The amount of lift and/or thrust provided by each of the blades 104 and the tracking path traveled by each of the blades 104 depends on aerodynamic characteristics of the respective blade. For example, each of the blades 104 has a particular airfoil, a pitching moment, a weight distribution, a twist, a chord length, etc.

An operator of the helicopter 100 manipulates the blades 104 via controls in communication with the rotor system 102. For example, the operator uses a collective input to control an altitude of the helicopter 100. The collective input simultaneously changes an angle of attack or pitch of each blade a same or equal amount. Additionally, the operator uses a cyclic input to control lateral movement (e.g., left, right, forward, aft) of the helicopter 100. The cyclic input changes the angle of attack or pitch of each blade as a function of position during a revolution relative to, for example, an airframe. The example rotor system 102 of FIG. 1 includes a swashplate in communication with the collective and cyclic inputs to implement the changes in angle of attack or pitch. The example rotor system of FIG. 1 includes links (e.g., rods and/or pins) extending from the swashplate to the blades 104 to implement the controls. For collective inputs, the swashplate is raised or lowered such that the each of the links alters the pitch of the corresponding blade 104 a same amount. For cyclic inputs, the swashplate is tilted such that the links alter the pitch of the corresponding blades 104 as a function of a position in a rotation. That is, as the blades 104 rotate, the cyclic input alters respective ones of the blades 104 based on where the blades 104 are in the rotation.

Additionally, twisting the blades 104 (e.g., statically during a certain type of flight such as take-off, landing, or cruise or multiple times per revolution) can reduce vibration, reduce noise and/or, more generally, increase performance. In the illustrated example, a torsion shaft is positioned in the blade. A first end of the blade 104 is fixed and another end of the blade 104 is allowed to twist. Applying a torque to the torsion shaft of the blade 104 causes the blade 104 to twist at the flexible tip of the blade 104. Thus, twisting the blade 104 alters the blade 104 from a baseline airfoil to a modified airfoil. The operator of the helicopter 100 may desire the modified airfoil of the blade 104 to, for example, more evenly distribute lift across the corresponding blade 104 during certain conditions and/or operating modes.

Known rotor systems that utilize such blade twisting techniques include multiple twist actuators, one for each blade to be twisted. As such, these known systems require duplicate position sensors, motors, motor brakes, reduction gearboxes, etc. Further, the individual actuators employed by known systems are each located at a distance (e.g., 6.5% of a rotor radius) away from a center of rotation of the rotor assembly. As such, the twist actuators of these known systems experience G-loading associated with positions located away from the center of rotation. Further, because blade pitch and blade twist involve rotational changes in similar directions (e.g., about a same axis or substantially similar axes), changes in blade pitch may undesirably affect blade twist. That is, alterations in blade pitch may introduce a certain measure of error in the corresponding blade twist. For example, when the blade 104 in known systems is forwardly pitched about a pitching moment, the twist of the blade 104 and the corresponding modified airfoil of the blade 104 are not preserved as the blade 104 pitches forward. Thus, in known systems, the twist of the blade 104 may be undesirably influenced when the blade 104 is pitched.

Examples disclosed herein include resolve or improve these and other problems of known systems that twist rotor blades. As described in detail below, examples disclosed herein include a single twist actuator to control the twist of any number of blades. For example, the single twist actuator of disclosed examples can control the twist of all four (4) of the example blades 104 of FIG. 1. Thus, examples disclosed herein reduce the weight, complexity, cost, and reliability issues associated with the duplicative parts involved in known systems having individual actuators for each blade. Further, the single twist actuator of examples disclosed herein is located at a center of rotation of the blades. Thus, examples disclosed herein eliminate or at least reduce the G-loading induced by the known systems that locate the individual twist actuators at distances away from the center of rotation. Additionally, examples disclosed herein include a gear assembly having first and second stages that operatively interact to reduce the amount of required actuator torque to twist the blades 104. Details and advantages of examples disclosed herein are provided below in connection with FIGS. 2-12.

Figure 2:
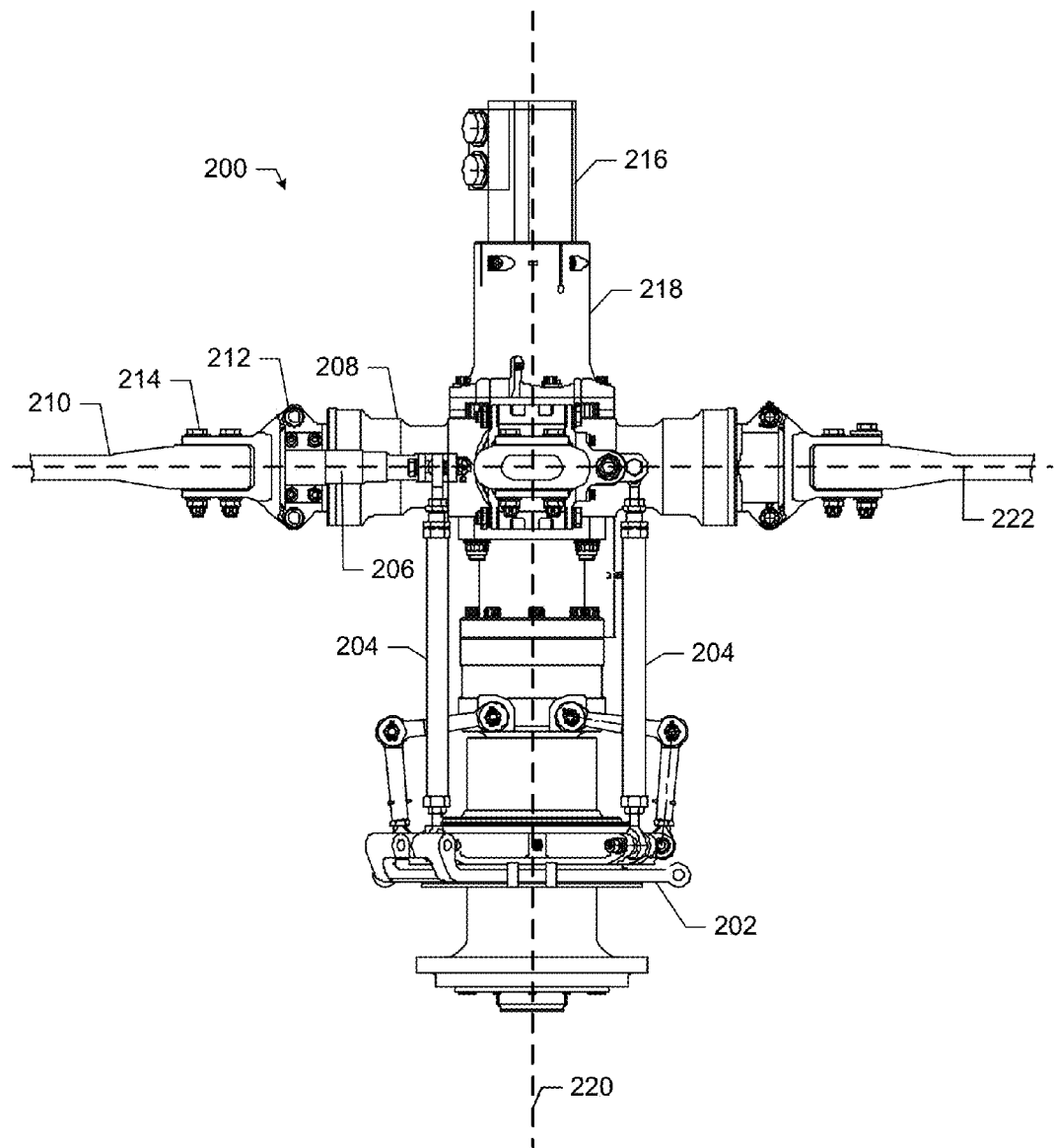
FIG. 2 is an elevation view of an example rotor assembly constructed in accordance with teachings of this disclosure.

FIG. 2 depicts an example rotor assembly 200 constructed in accordance with teachings of this disclosure. The example rotor assembly 200 of FIG. 2 receives commands such as, for example, collective control signals and cyclic control signals from an operator of the helicopter 100 of FIG. 1. As described above, the collective control signals adjust a pitch of each blade 104 similarly, while the cyclic control signals adjust pitch of the different blades 104 differently depending on the blade position in the rotation. To implement the collective controls and the cyclic controls, the example rotor assembly 200 includes a swashplate 202 that moves up and down (e.g., away from and towards a frame of the helicopter 100 of FIG. 1) via, for example, one or more hydraulic or other type of actuator (not shown) controlled by the control signals received from the operator of the helicopter 100. As the swashplate 202 moves up and down, pitch links 204 coupled to the swashplate 202 move up and down, collectively or cyclically according to the received control signals. Each of the pitch links 204 is coupled to a respective one of a plurality of pitch arms 206. Each of the pitch arms 206 converts the up and down movement of the corresponding pitch link 204 into rotational movement of a pitch shaft (not shown in FIG. 2) disposed in a hub barrel 208. For example, as one of the pitch links 204 moves upward, the corresponding one of the pitch arms 206 rotates the corresponding one of the pitch shafts upward (e.g., toward the top of the helicopter 100). Conversely, as one of the pitch links 204 moves downward, the corresponding one of the pitch arms 206 rotates the corresponding one of the pitch shafts downward (e.g., toward the bottom of the helicopter 100). Different ones of the pitch shafts may be pitched in a same manner (e.g., upwardly) simultaneously (e.g., in response to collective inputs) or differently (e.g., some upwardly and some downwardly) simultaneously (e.g., in response to cyclic inputs). Each of the pitch shafts of the hub barrels 208 is coupled to a blade root 210 via a finger joint 212 and a blade grip 214. As such, the pitch of the pitch shafts is applied to the blades 104. Accordingly, the swashplate 202 and the corresponding actuators that receive commands from the operator enable the helicopter 100 to pitch, roll, and/or translate.

The example rotor assembly 200 of FIG. 2 includes a twist actuator 216 to control a twist of each blade of the example rotor assembly 200. Notably, the example twist actuator 216 of FIG. 2 is positioned or located at a center of rotation of the example rotor assembly 200 of FIG. 2. This location of the twist actuator 216 corresponds to a low-G position, especially relative to locations inside the example hub barrels 208, as in known systems. Notably, the example twist actuator 216 of FIG. 2 controls twist for all of the blades, rather than implementing separate actuators for each blade 104, as in known systems. In the illustrated example of FIG. 2, the twist actuator 216 includes an electric motor, a motor brake, a position feedback sensor, and motor speed-reduction gears. Additionally or alternatively, the example twist actuator 216 may include one or more hydraulic and/or any other suitable type of driving component(s) and/or sources of torque. The example rotor assembly 200 of FIG. 2 includes a twist actuator stabilizer 218 through which the example twist actuator 216 is mounted. As such, the example twist actuator 216 is mounted inside a rotor head mast, which reduces an aerodynamic drag associated with the twist actuator 216 and protects the components of the twist actuator 216 from external factors.

As described in detail below in connection with FIGS. 5-12, the example twist actuator 216 drives a rotation of an actuator drive shaft about a first axis 220. While not always corresponding to a strictly vertical axis due to, for example, movement of the helicopter 100, the first axis 220 is referred to herein as the vertical axis 220. Further, as described in detail below in connection with FIGS. 5-12, the example rotor assembly 200 of FIG. 2 includes a bevel gear assembly to convert the rotation of the actuator drive shaft about the vertical axis 220 into a plurality of rotations about second axes, of a plurality of planet carrier drive shafts each disposed in one of the hub barrels 208. One of the second axes 222 is shown in FIG. 2 While not always corresponding to a strictly horizontal axis due to, for example, movement of the helicopter 100, the second axes 222 are referred to herein as the horizontal axes 222. Further, as described in detail below in connection with FIGS. 5-12, each of the individual planet carrier drive shafts is coupled to a gear assembly disposed in a respective one of the hub barrels 208 and the corresponding blade grip 214. The gear assemblies provide a gear reduction for an output shaft that is coupled to a torsion shaft in the blades 104. As the output shaft rotates in accordance with the input provided by the twist actuator 216, the torsion shaft twists the blades 104. Accordingly, the twist actuator 216 drives the twisting of each of the blades 104.

Figure 3:
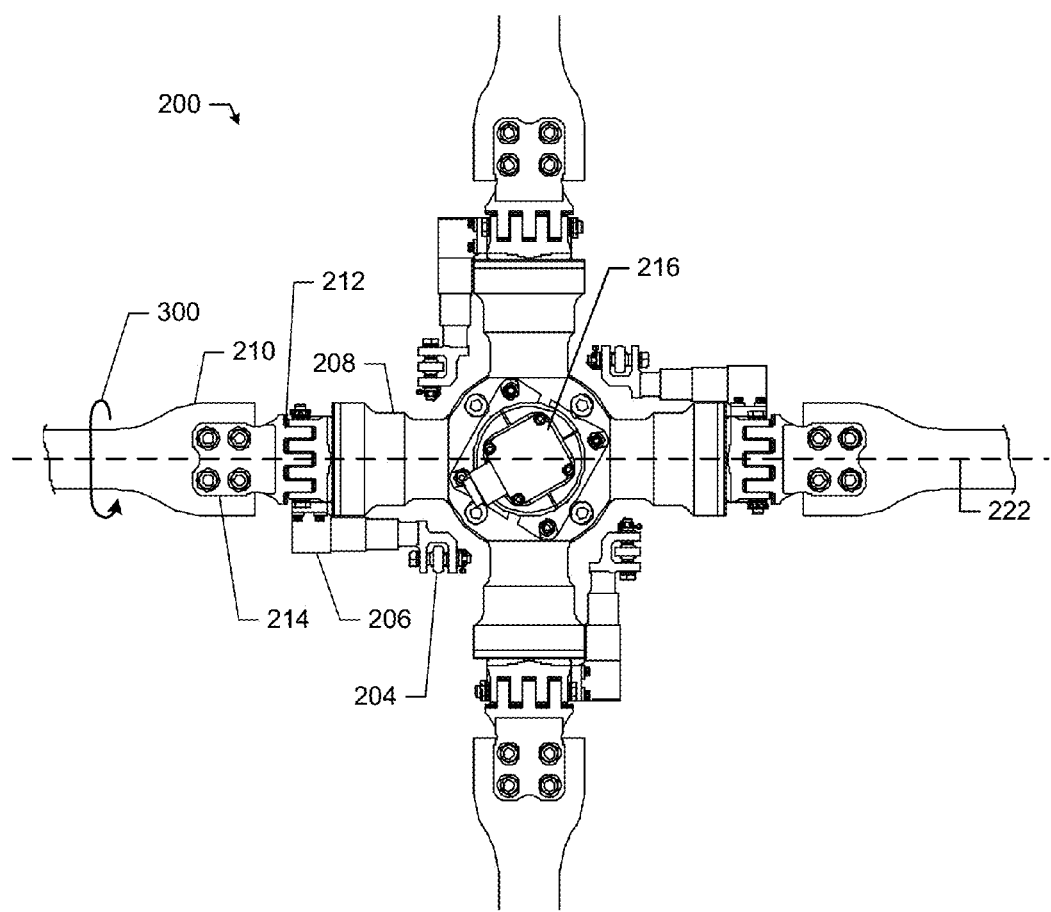
FIG. 3 is a plan view of the example rotor assembly of FIG. 2.

FIG. 3 depicts the example rotor assembly 200 of FIG. 2 from a different perspective. As shown in FIG. 3, the twist actuator 216 is centrally located in the rotor assembly 200, thereby positioning the twist actuator 216 at a low-G location in the rotor assembly 200. The twist actuator 216 provides torque to each of the torsion shafts of the blades 104 from its central location in the rotor assembly 200. Although not shown in FIG. 3, the distal ends of the blades 104 twist in response to the torque provided by the twist actuator 216 due to a torque tube inside the blade root 210 being rotated at the blade grip 214. Therefore, as the torque tube inside the blade root 210 is rotated, the blade 104 is twisted near the tip to form a modified airfoil. The example of FIG. 3 illustrates a first rotational direction 300 in which the torque is applied to the torque tube inside the blade root 210. In some examples, the torque is applied to the torque tube inside the blade root 210 in a second rotational direction opposite the first rotational direction 300 of FIG. 3.

Figure 4:
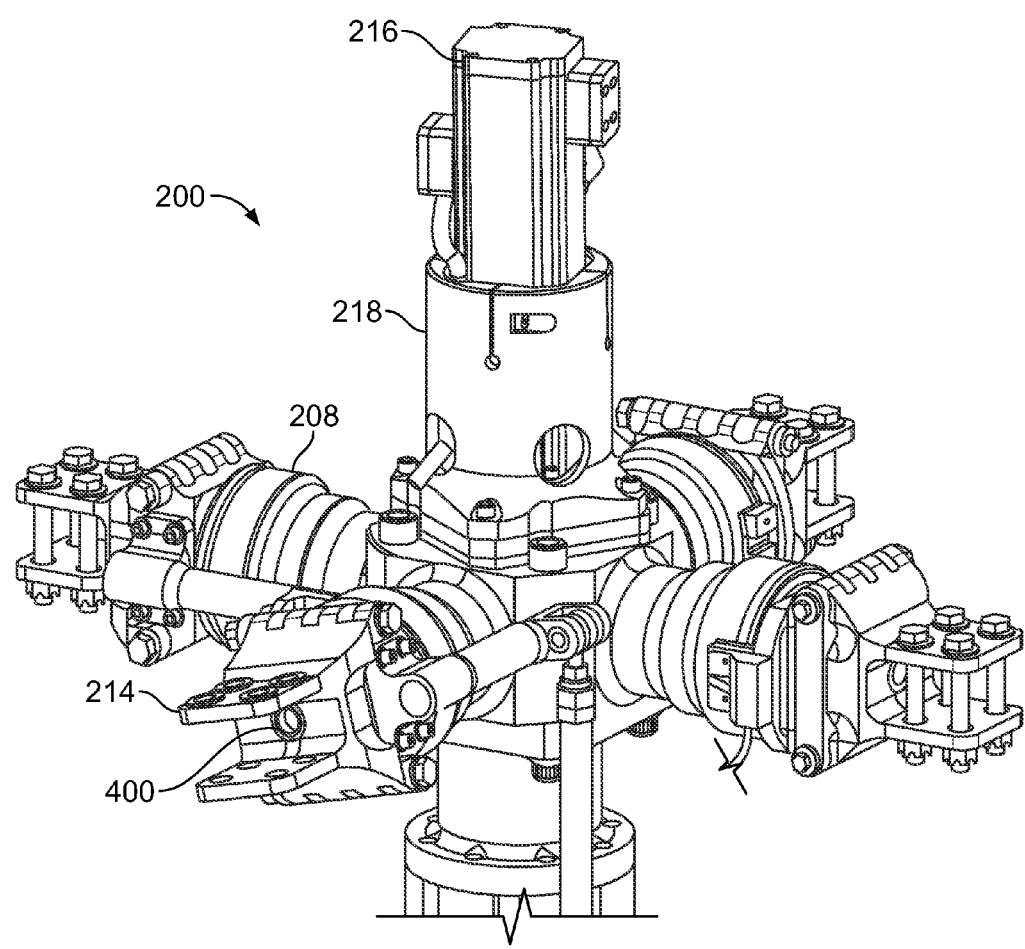
FIG. 4 is an isometric view of the example rotor assembly of FIGS. 2 and 3.

FIG. 4 is an isometric view of the example rotor assembly 200 FIGS. 2 and 3. In the example of FIG. 4, the blade roots 210 are not shown in the blade grips 214. As such, an opening 400 in the blade grip 214 is visible in FIG. 4. As disclosed in detail below, the opening 400 receives a twist output shaft (not shown in FIG. 4), which engages a torsion shaft disposed in the blade root 210.

Figure 5:
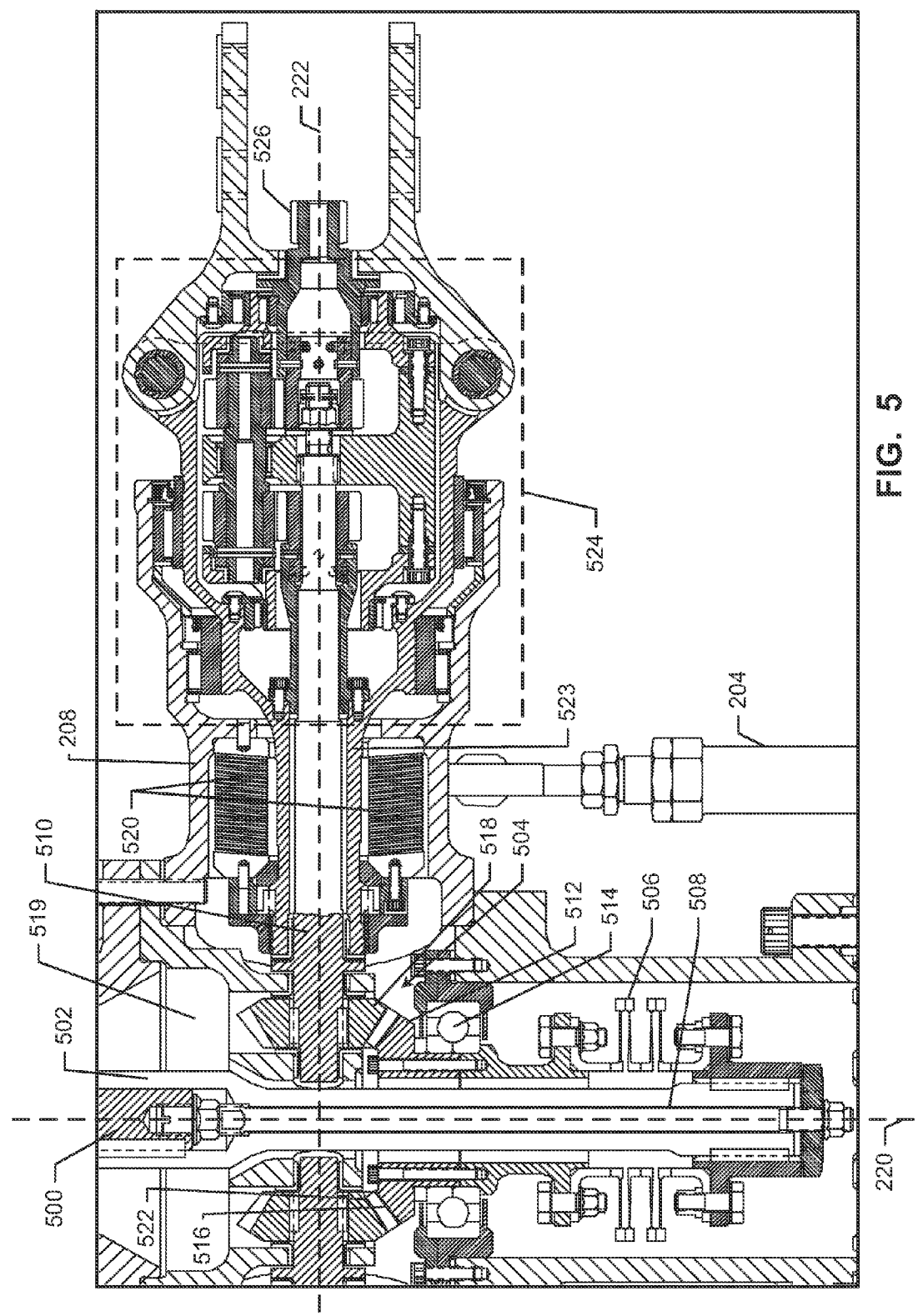
FIG. 5 is a partial cross-sectional view of the example rotor assembly of FIGS. 2-4 including an example gear reduction assembly.

FIG. 5 is a partial cross-sectional view of the example rotor assembly 200 that illustrates an example manner in which the twist actuator 216 drives the twisting of the blade 104. In the example of FIG. 5, an actuator input shaft 500 is driven by a motor of the twist actuator 216 (not shown). The motor of the twist actuator 216 is, for example, an example motor coupled to the actuator input shaft 500. In the example of FIG. 5, the actuator input shaft 500 is coupled to an actuator drive shaft 502. Thus, the motor of the twist actuator 216 drives the rotation of the actuator drive shaft 502 about the vertical axis 220.

In the example of FIG. 5, the actuator drive shaft 502 is coupled to a bevel gear assembly 504 via a diaphragm coupling 506. The example diaphragm coupling 506 of FIG. 5 enables the motor of the twist actuator 216 to be independent of the gear assemblies described below, which improves maintainability and protects the twist actuator 216 and the gear assemblies from misalignment loads. Further, the diaphragm coupling 506 of FIG. 5 is flexible and internally mounted within a rotor head mast, thereby physically protecting components of the twist actuator 216 and reducing the aerodynamic drag profile of the rotor assembly 200. Further, the example of FIG. 5 includes a coupling preload stud 508 to provide preload compression to the diaphragm coupling 506 to extend its lifetime and protect the twist actuator 216 from overload conditions.

In the example of FIG. 5, the bevel gear assembly 504 converts rotation of the actuator drive shaft 502 about the vertical axis 220 into rotation of a planet carrier drive shaft 510 about the horizontal axis 222. In the example of FIG. 5, the bevel gear assembly 504 includes a bull gear 512 and a bull gear ball-bearing 514. The bull gear 512 is concentric with the actuator drive shaft 502 and rotates in conjunction with the actuator drive shaft 502 about the vertical axis 220. The bull gear 512 has a first toothed face 516 that is angled (e.g., relative to the vertical axis 220). The example bevel gear assembly 504 includes a plurality of pinion gears 518, one for each of the hub barrels 208. Each of the pinion gears 518 corresponds to and travels about the rotor assembly 200 inside a hub cartridge 519. Each of the pinion gears 518 is centrally retained inside a hub cartridge 519. Each of the planet carrier drive shafts 510 is retained in the respective hub barrels 208 via an elastomeric bearing 520 that requires the planet carrier drive shaft 510 to slide inside the pinion gear 518 while experiencing the centrifugal forces associated with the rotor assembly 200. In particular, bearing deflections from high rotor blade centrifugal loads may cause movement in the planet carrier drive shafts 510 during, for example, startup and shutdown. In the illustrated example of FIG. 5, the retention of the pinion gears 518 via the hub cartridge 519 prevents such movement from affecting the pinion gear mesh with the bull gear 512. In particular, the elastomeric bearing 520 receives the centrifugal forces and maintains the position of the planet carrier shafts 510, as well as the blades 104, in the hub barrels 208.

The pinion gears 518 each have a second toothed face 522 to mesh with the first toothed face 516 of the bull gear 512. The second toothed face 522 of the pinion gears 518 is angled (e.g., relative to the vertical axis 220). That is, the teeth of the bull gear 512 mesh with the teeth of the pinion gears 518 as the actuator drive shaft 502 rotates about the vertical axis 220. Accordingly, in the example of FIG. 5, the rotation of the bull gear 512, via its coupling with the actuator drive shaft 502, drives a rotation of the pinion gears 518 about the respective horizontal axes 222. It is noted that the horizontal axis 222 for each of the pinion gears 518 does not move with a pitch rotation but does move with the blades 104 about the rotor assembly 200. However, the rotation of the pinion gears 518 is consistently substantially (e.g., within a threshold) perpendicular to the vertical axis 220.

For each of the pinion gears 518, the corresponding planet carrier shaft 510 extends from the pinion gear 518 such that the rotation of the planet carrier shaft 510 about the horizontal axis 222 corresponds to the rotation of the pinion gear 518. In the example of FIG. 5, the planet carrier shaft 510 extends through a pitch shaft 523 that is coupled to the corresponding one of the pitch arms 206 (not shown in FIG. 5). Notably, the planet carrier shaft 510 rotates independently of the pitch shaft 523, thereby separating the twist driving rotation of the planet carrier shaft 510 from the pitch driving rotation of the pitch shaft 523. Thus, the bull gear 512 rotates in response to input from the twist actuator 216, the planet carrier shaft 510 rotate about the horizontal axis 222. Thus, as the actuator drive shaft 502 rotates about the vertical axis 220, the first toothed face 516 of the bull gear 512 meshes with each of the second toothed faces 522 of the pinion gears 518, thereby causing the rotation of the planet carrier drive shaft 510 about the horizontal axis 222. Thus, the twist actuator 216, via the actuator drive shaft 502 and the bevel gear assembly 504, causes the plant carrier drive shaft 510 to rotate about the horizontal axis 222.

The example bevel gear assembly 504 is a straight tooth design that generates similar loads in different rotational directions about the horizontal axis 222. In the illustrated example of FIG. 5, the gear ratio of the bevel gear assembly 504 generates an increase in speed of the planet carrier drive shaft 510 of approximately fifty (50) percent to allow the use of the multiple pinion gears 518 (e.g., one for each rotor blade 104 being driven by the twist actuator 216) mated to the single bull gear 512. Accordingly, the example rotor assembly 200 of FIG. 5 distributes the power provided by the twist actuator 216 to each rotor blade 104 from the central location of the twist actuator 216.

Additionally, the example rotor assembly 200 of FIG. 5 includes a gear reduction assembly 524. The example gear reduction assembly 524 of FIG. 5 is described in detail below in connection with FIGS. 6-10. The view of the gear reduction assembly 524 of FIG. 5 is reproduced in FIG. 10 for clarity. Generally, the example gear reduction assembly 524 receives a first amount of torque about the horizontal axis 222 from the planet carrier shaft 510 and outputs a second amount of torque about the horizontal axis 222 on an output shaft 526. The output shaft 526 is connected to a torsion shaft located in the blade root 210. Thus, the gear reduction assembly 524 facilitates delivery of torque from the pinion gear 518, which is driven by the example twist actuator 216, to the torsion shaft located in the blade root 210. As described in detail below, in delivering the torque to the output shaft 526, the example gear reduction assembly 524 achieves a gear reduction ratio that amplifies torque provided by the example twist actuator 216 to reduce the torque requirement and/or size of the twist actuator 216.

Figure 6:
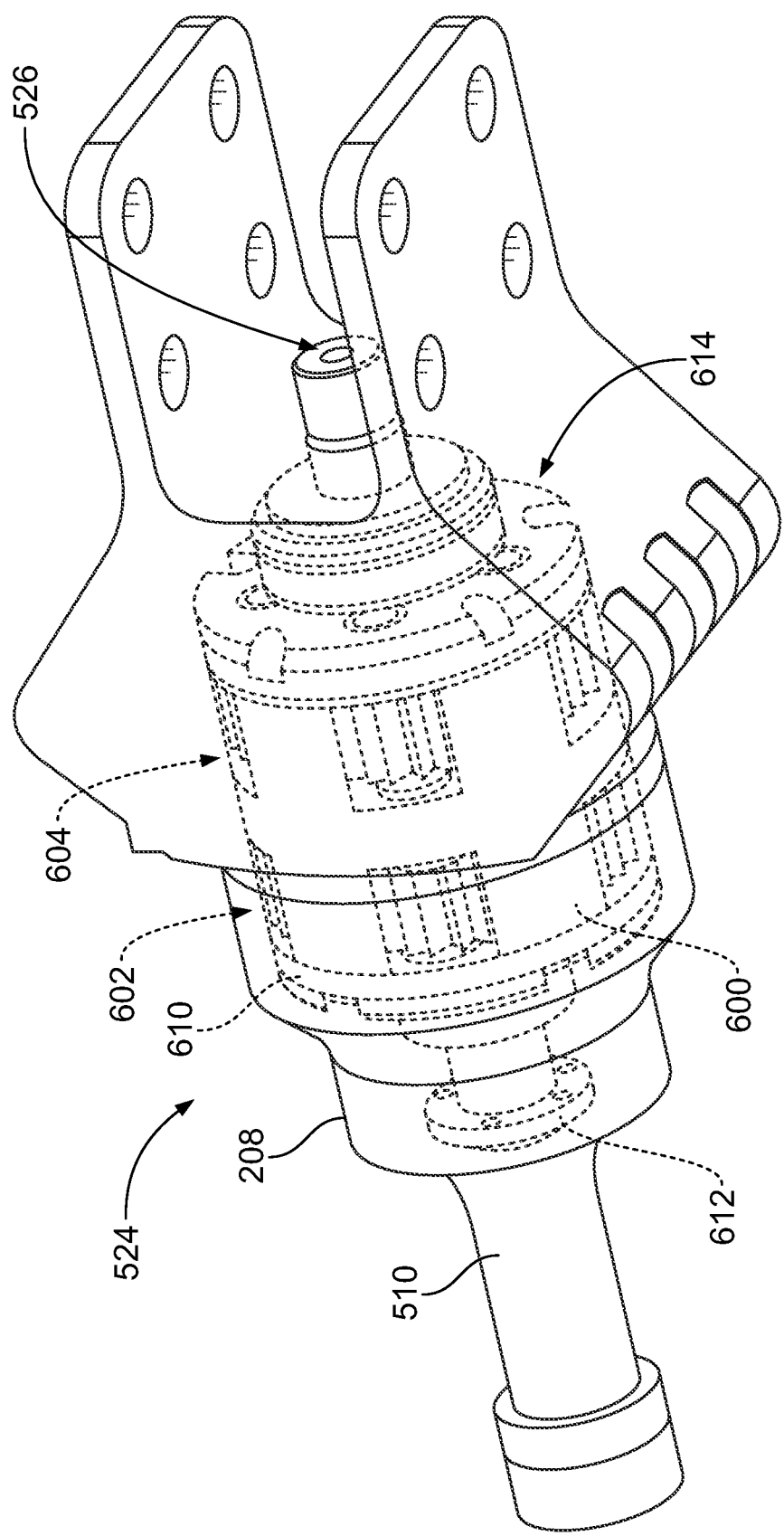
FIG. 6 is an isometric view of the example gear reduction assembly of FIG. 5 including a first stage planetary gear system and a second stage planetary gear system.
Figure 7:
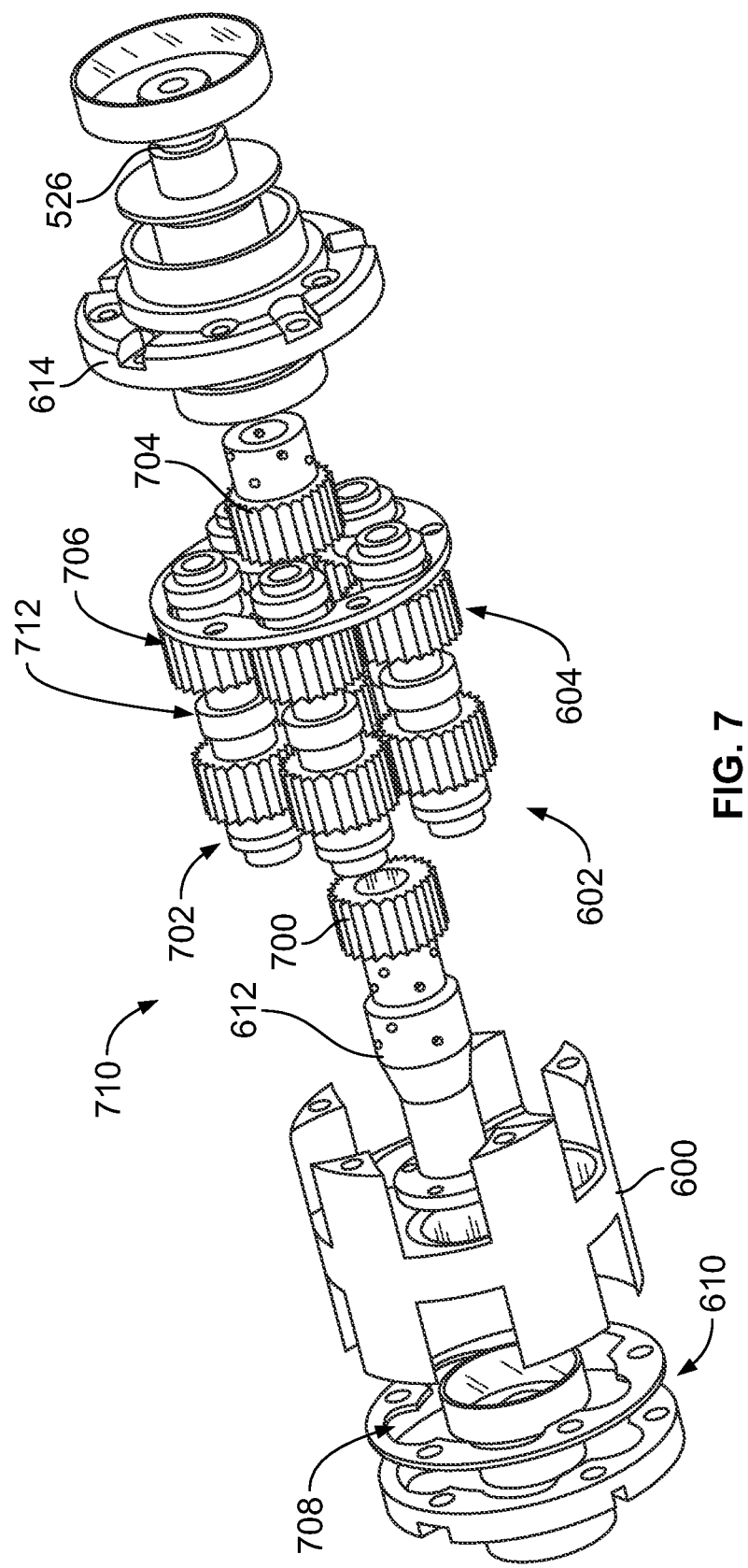
FIG. 7 is an exploded view of the example gear reduction assembly of FIGS. 5 and/or 6.

FIG. 6 is an isometric view of an implementation of the gear reduction assembly 524 of FIG. 5 constructed in accordance with teachings of this disclosure. FIG. 7 is an exploded view of the example gear reduction assembly 524 of FIG. 6. The example gear reduction assembly 524 of FIG. 6 includes a planet carrier 600 that carries a first stage planetary gear system 602 and a second stage planetary gear system 604. The first stage planetary gear system 602 is housed (at least partially) in the pitch shaft 523. The second stage planetary gear system 604 is housed (at least partially) in the blade grip 214 outboard of the pitch shaft 523. The first stage planetary gear system 602 has a first stage sun gear 700 (FIG. 7) and first stage planet gears 702 (FIG. 7). In the illustrated example, the first stage planetary gear system 602 includes five (5) first stage planet gears 702. However, the first stage planetary gear system 602 may include an alternative number of first stage planet gears 702. The second stage planetary gear system 604 has a second stage sun gear 704 (FIG. 7) and second stage planet gears 706 (FIG. 7). In the illustrated example, the second stage planetary gear system 604 includes five (5) second stage planet gears 706. However, the second stage planetary gear system 604 may include an alternative number of second stage planet gears 704.

As described above, the twist actuator 216 drives a rotation of the planet carrier drive shaft 510 when the blade is to be twisted. The example planet carrier 600 is keyed to the planet carrier drive shaft 510 such that as the planet carrier drive shaft 510 rotates, so does the planet carrier 600. In the example of FIGS. 6 and 7, the planet carrier 600 is coupled to a first cap assembly 610 that is coupled to the planet carrier drive shaft 510. As shown in FIG. 7, the first cap assembly 610 includes a plurality of bores 708 (FIG. 7), each to receive an end 710 (FIG. 7) of one of a plurality of planet shafts 712 (FIG. 7). That is, the ends 710 of the planet shafts 712 are positioned in the bores 708 of the first cap assembly 610, which is coupled to the planet carrier 600. As such, rotation of the planet carrier drive shaft 510 about the horizontal axis 222 causes the first cap assembly 610 and the planet carrier 600 to rotate about the horizontal axis 222. Further, rotation of the planet carrier 600 and the first cap assembly 610 cause the first stage planet gears 702 to traverse, as a set, about the horizontal axis 222.

The first stage planet gears 702 are meshed with the first stage sun gear 700. The first sun gear 700 is fixed relative to the first stage planet gears 702. In particular, the first stage sun gear 700 is fixed to the pitch shaft 523 of the rotor assembly 200 via a mounting shaft 612. As described above in connection with FIG. 5, the planet carrier drive shaft 510 extends through the pitch shaft 523 and through the mounting shaft 612, which is fixed to the pitch shaft 523. Thus, the planet carrier drive shaft 510 rotates within the mounting shaft 612, which is fixed to the first stage sun gear 700. As such, when the planet carrier drive shaft 510 rotates the planet carrier 600, the first stage planet gears 702 mesh with and rotate about (as a set) the first stage sun gear 700.

In the illustrated example, the ratio between the first stage sun gear 700 and the first stage planet gears 702 is one (1) to one (1). However, alternative ratios are possible to achieve different reduction(s). Rotation of the first stage planet gears 702 causes rotation of the planet shafts 712, to which the first stage planet gears 702 are mounted. The second stage planet gears 706 are also mounted to the planet shafts 712. Thus, rotation of the first stage planet gears 702 drives a rotation of the planet shafts 712, which causes the second stage planet gears 706 to rotate, as a set, about the horizontal axis 222. The second stage planet gears 706 are meshed with the second stage sun gear 704. The rotation of the second stage planet gears 706, as meshed with the second stage sun gear 704, cause the second stage sun gear 704 to rotate about its axis (i.e., the horizontal axis 222). In the illustrated example, the ratio between the second stage planet gears 706 and the second stage sun gear 704 is seven (7) to eight (8). However, alternative ratios are possible to achieve different reduction(s).

The second stage sun gear 704 is coupled to the output shaft 526 such that the rotation of the second stage sun gear 704 causes the output shaft 526 to rotate about the horizontal axis 222. Thus, the output shaft 526 rotates in accordance with the rotation of the second stage sun gear 704. The output shaft 526 extends through a second cap assembly 614. As described above, the output shaft 526 is coupled to the blade twist torque tube (not shown) via the opening 400 (FIG. 4) in the blade grip 214. As such, rotation of the output shaft 526 applies torque to the blade twist torque tube (not shown).

Thus, the example gear reduction assembly 524 facilitates delivery of torque from the planet carrier drive shaft 510, which is driven by the example twist actuator 216, to the blade twist torque tube. In particular, the planet carrier drive shaft 510 drives rotation of the planet carrier 600, which drives the first and second planetary gear systems 602, 604, which cooperate to rotate the output shaft 526 while providing a gear reduction. In the illustrated example, the operative interaction of the planet carrier 600 and the planetary gear systems 602, 604 results in a gear reduction ratio of eight (8) to (1). As described above, such a gear reduction ratio is achieved via a one (1) to one (1) ratio between the first stage sun gear 700 and the first stage planet gears 702, and a seven (7) to eight (8) ratio between the second stage planet gears 706 and the second stage sun gear 704. Alternative gear reduction ratios are possible with alternative ratios between the first stage planet gears 702 and the first stage sun gear 700 and/or between the second stage planet gears 706 and the second stage sun gear 704. The gear reduction provided by the example gear assembly 524 amplifies torque provided by the example twist actuator 216 to reduce the torque requirement and/or size of the twist actuator 216. In some examples, the gear reduction ratio includes a speed up contribution from the bevel gear assembly 504.

Figure 8:
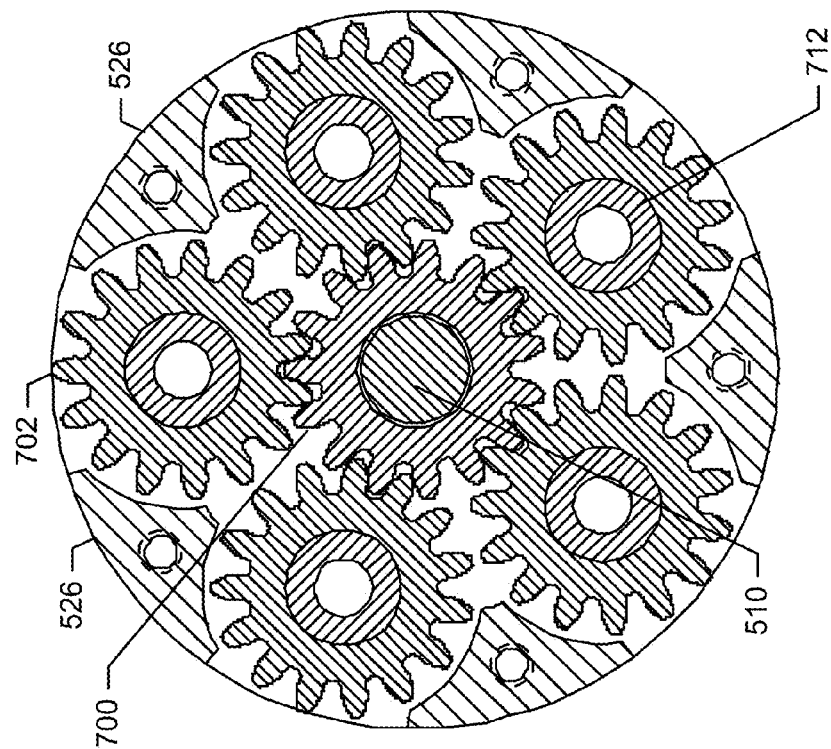
FIG. 8 is a cross-sectional view of the example first stage planetary gear assembly of FIGS. 6 and 7.

FIG. 8 depicts an example implementation of the example first stage planetary gear system 602 and the example planet carrier 600. In the example of FIG. 8, the first stage planet gears 702 each have fifteen (15) teeth. In the example of FIG. 8, the first stage sun gear 700 has fifteen (15) teeth. As such, the ratio provided by the example first stage planetary gear system 602 is one (1) to (1). As described above, the planet carrier drive shaft 510 (which is driven by the example twist actuator 216) drives the rotation of the planet carrier 600 and the first stage planet gears 702 about the first stage sun gear 700. As a result, the first stage planet gears 702 drive rotation of the planet shafts 712 to which the first stage planet gears 702 are mounted.

Figure 9:
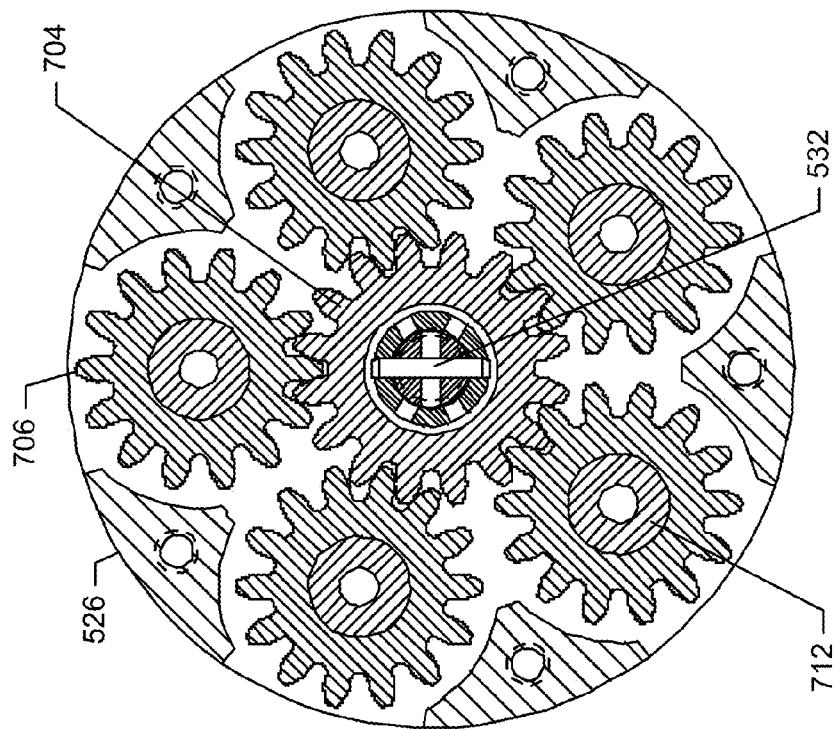
FIG. 9 is a cross-sectional view of the example second stage planetary gear system of FIGS. 6 and 7.

FIG. 9 depicts an example implementation of the example second stage planetary gear system 604 and the example planet carrier 600. In the example of FIG. 9, the planet shafts 712, as driven by the rotation of the first stage planet gears 702, cause the second stage planet gears 706 to mesh with the second stage sun gear 704. In the example of FIG. 9, the second stage planet gears 706 have fourteen (14) teeth. In the example of FIG. 9, the second stage sun gear 704 has sixteen (16) teeth. As such, the ratio provided by the example first stage planetary system 530 is seven (7) to eight (8). The meshing of the second stage planet gears 706 with the second stage sun gear 704 cause the second stage sun gear 704 to rotate about its axis, thereby providing torque to the output shaft 526 to which the second stage sun gear 704 is coupled. When the example reduction provided by the first stage planetary gear system 602 and the reduction provided by the second stage planetary gear system 604 are combined, the achieved reduction ratio is eight (8) to (1). Accordingly, the example gear reduction assembly 524 reduces the torque required of the twist actuator 216 to provide a suitable amount of torque to the output shaft 526.

Figure 10:
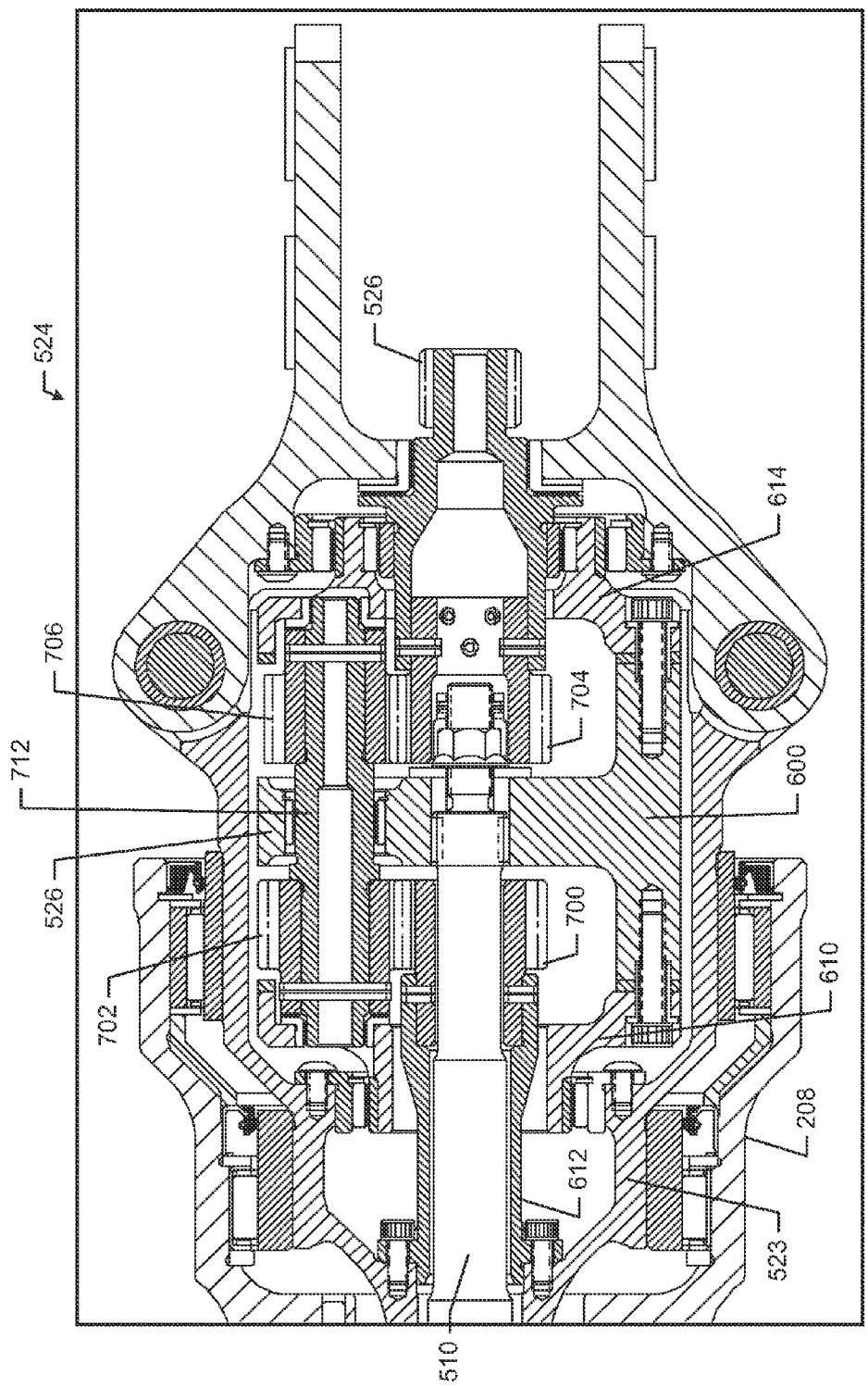
FIG. 10 is a cross-sectional view of the example gear reduction assembly of FIGS. 5-7.

FIG. 10 is an enlarged version of the cross-sectional view of the example gear reduction assembly 524 of FIG. 5. As described above, the planet carrier drive shaft 510 extends through the mounting shaft 612, which is fixed to the pitch shaft 523. The mounting shaft 612 is coupled to the first stage sun gear 700, thereby fixing the first stage sun gear 700 to the pitch shaft 523. As described above, the planet carrier drive shaft 510 is coupled to the planet carrier 600 such that rotation of the planet carrier drive shaft 510 drives rotation of the planet carrier 600. As described above, the planet carrier 600 houses the first stage sun gear 700 and the first stage planet gears 702. Additionally, as described above, the planet carrier 600 houses the second stage sun gear 704 and the second stage planet gears 706. Further, as described above, the first stage planet gears 702 and the second stage planet gears 706 are mounted to the planet shafts 712. The first and second planetary gear systems 602, 604 amplify and deliver the torque provided by the planet carrier drive shaft 510 to the output shaft 526 via a coupling between the second stage sun gear 704 and the output shaft 526.

Figure 11:
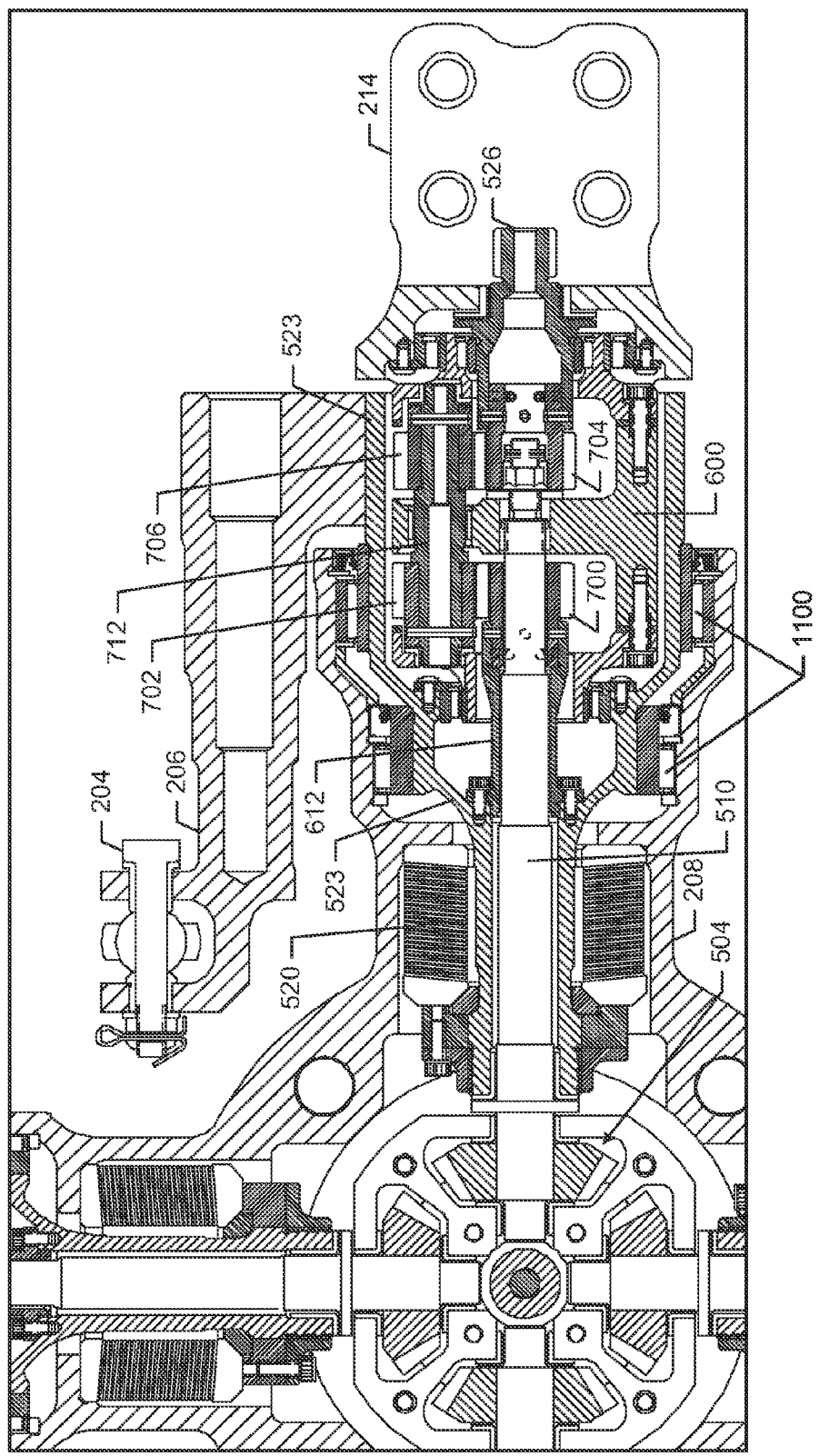
FIG. 11 is another cross-sectional view of the example gear reduction assembly of FIGS. 5-7.

FIG. 11 is a partial plan view of the example rotor assembly 200. As shown in FIG. 11, a plurality of roller bearings 1100 are disposed between the pitch shaft 523 and the hub barrel 208. The roller bearings 1100 enable the pitch shaft 523, which is pitched upward and downward by the pitch arm 206, to rotate within the hub barrel 208. However, because the first stage sun gear 700 is fixed to the pitch shaft 523 and the pitch shaft 523 is coupled to the pitch arm 206, pitch changes of the rotor blades 104 may cause minor changes in the twist of the blades 104. In some examples, these minor changes in twist may be considered errors. For example, in some systems, an error of one (1) degree at the second stage sun gear 704 may result from eight (8) degrees of blade pitch angle of the pitch shaft 1000. However, the reduction provided by the example gear reduction assembly 524 coupled to the blade twist torque tube (not shown) significantly reduces the potential error in blade twist in such scenarios. In particular, the reduction provided by the gear reduction assembly 524 coupled to the blade twist torque tube enables ten (10) degrees of rotation of the second stage sun gear 704 to result in one (1) degree of blade twist due to torque tube windup, thereby also reducing any potential errors in twist. In particular, the illustrated example including the torque tube reduces the above example error of one (1) to eight (8) down to 0.1 (or one tenth) of blade twist to every eight degrees of blade pitch. For rotor blade steady pitch, the error can be eliminated by jogging the twist actuator 216 to achieve a proper twist setting. For rotor blade oscillatory or cyclic pitch, the error can be further reduced with sun and planet gears that have a greater number of teeth. For example, if the number of gear teeth is doubled, the error will be cut in half.

Figure 12:
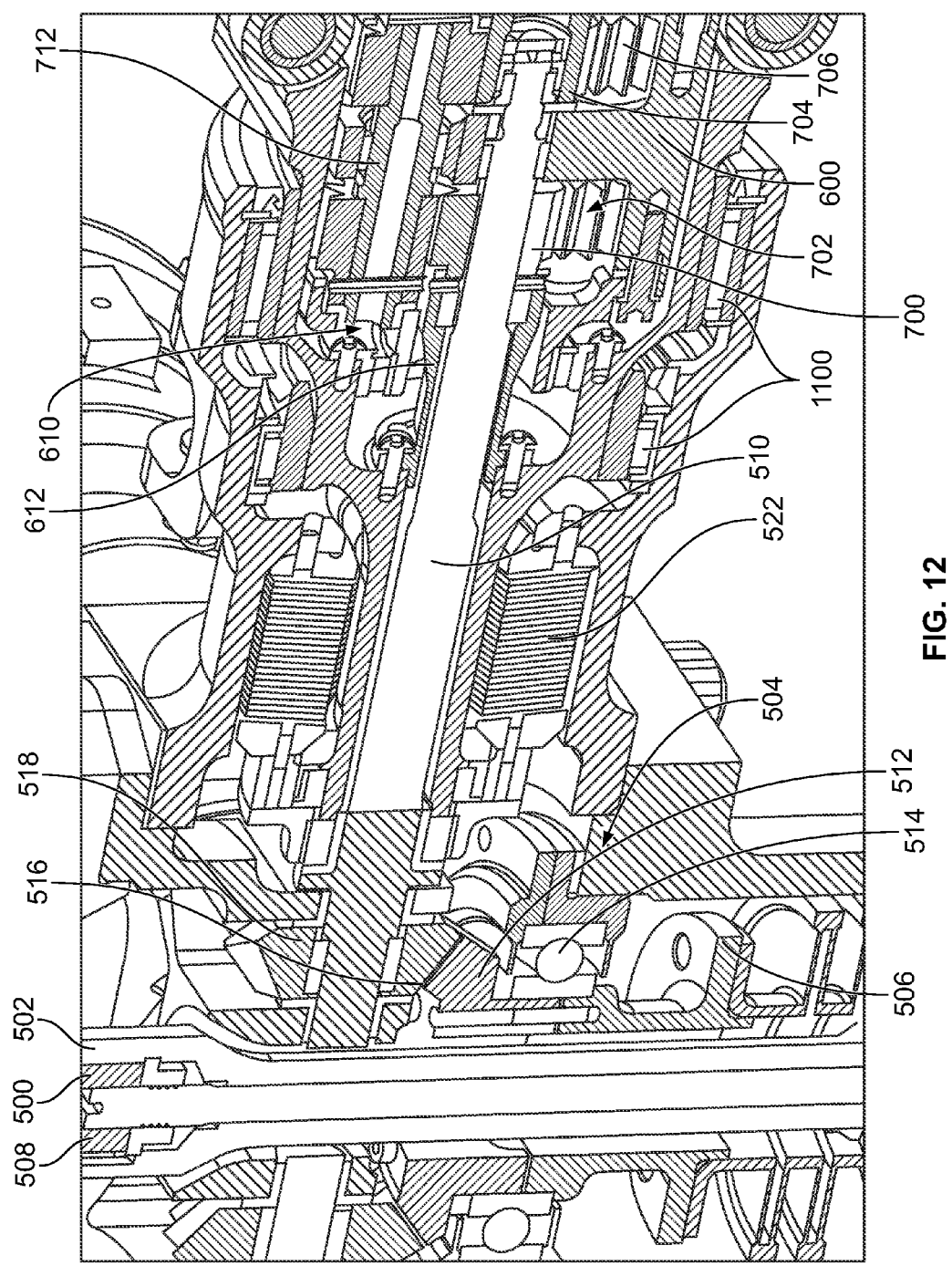
FIG. 12 is an isometric view of the example rotor assembly of FIGS. 1-5.

FIG. 12 is an isometric view of the example rotor assembly 200 as described above in connection with FIGS. 2-11.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a first gear assembly to convert torque about a first axis provided by a central actuator of a rotor assembly into second torques about second axes, the second axes being different than the first axis, the first gear assembly comprising:
  a first angled gear concentric with a first drive shaft of the central actuator; and
  second angled gears, each of the second angled gears to mesh with the first angled gear;
 a second gear assembly to receive one of the second torques about one of the second axes via a second drive shaft, the second gear assembly comprising:
  a first planetary gear system driven by the second drive shaft; and
  a second planetary gear system driven by the first planetary gear system, the second planetary gear system comprising a sun gear coupled to an output shaft, wherein the second gear assembly comprises a planet carrier to house the first planetary gear system and the second planetary gear system.

2. An apparatus as defined in claim 1, wherein the first planetary gear system being driven by the second drive shaft comprises the second drive shaft driving the planet carrier.

3. An apparatus as defined in claim 1, wherein the output shaft is to twist a rotor blade.

4. An apparatus as defined in claim 1, wherein first planetary gear system comprises a sun gear fixed to a pitch shaft.

5. The apparatus as defined in claim 1, further comprising:
the central actuator to drive a first rotation of the first drive shaft about the first axis, the central actuator positioned at a center of rotation of the rotor assembly; and
the first gear assembly to convert the first rotation into a plurality of second rotations of a plurality of second shafts including the second drive shaft, each of the second shafts to provide torque to blades coupled to the rotor assembly.

6. The apparatus as defined in claim 5, further comprising carriers, each carrier coupled to a respective one of the second shafts.

7. The apparatus as defined in claim 5, wherein the first gear assembly comprises a bull gear and pinion gears, each of the second shafts extending from respective ones of the pinion gears.

8. The apparatus as defined in claim 7, wherein the bull gear is coupled to the first drive shaft via a diaphragm coupling.

9. The apparatus as defined in claim 7, wherein the bull gear comprises first teeth angled relative to the first axis, and each of the pinion gears comprises second teeth angled relative to the first axis.

10. The apparatus as defined in claim 5, wherein the first axis is different than each of the second axes corresponding to respective ones of the second shafts.

11. The apparatus as defined in claim 5, wherein the torque is applied to a torsion shaft of the respective blades to cause the respective blades to twist.

12. An apparatus comprising:
a first gear assembly to convert torque about a first axis provided by a central actuator of a rotor assembly into second torques about second axes, the second axes being different than the first axis, the first gear assembly comprising:
a first angled gear concentric with a first drive shaft of the central actuator; and
second angled gears, each of the second angled gears to mesh with the first angled gear; and
a second gear assembly to receive one of the second torques about one of the second axes via a second drive shaft, the second gear assembly comprising:
a first planetary gear system driven by the second drive shaft; and
a second planetary gear system driven by the first planetary gear system, the second planetary gear system comprising a sun gear coupled to an output shaft;
a carrier coupled to the second drive shaft, the second drive shaft extending through a pitch shaft of a rotor assembly, the second drive shaft providing a first amount of torque to the carrier;
the first planetary gear system disposed in the carrier, the carrier to drive rotation of the first planetary gear system;
the second planetary gear system disposed in the carrier; and
an output of the second planetary gear system to provide a second amount of torque to a blade.

13. The apparatus as defined in claim 12, wherein the first planetary gear system comprises a first stage sun gear, the first stage sun gear being fixed to the pitch shaft.

14. The apparatus as defined in claim 13, wherein first stage planet gears mesh with the first stage sun gear, and each of the first stage planet gears is mounted to a planet shaft.

15. The apparatus as defined in claim 14, wherein the second planetary gear system comprises a second stage sun gear, the output of the second planetary gear system comprising the second stage sun gear.

16. The apparatus as defined in claim 15, wherein second stage planet gears mesh with the second stage sun gear, and each of the second stage planet gears is mounted to a respective one of the planet shafts.

17. The apparatus as defined in claim 16, wherein each of the planet shafts comprises an end received by a bore in a cap assembly, the cap assembly being coupled to the carrier.

18. An apparatus comprising:
a first gear assembly to convert torque about a first axis provided by a central actuator of a rotor assembly into second torques about second axes, the second axes being different than the first axis, the first gear assembly comprising:
a first angled gear concentric with a first drive shaft of the central actuator; and
second angled gears, each of the second angled gears to mesh with the first angled gear; and
a second gear assembly to receive one of the second torques about one of the second axes via a second drive shaft, the second gear assembly comprising:
a first planetary gear system driven by the second drive shaft; and
a second planetary gear system driven by the first planetary gear system, the second planetary gear system comprising a sun gear coupled to an output shaft;
the central actuator to drive a first rotation of the first drive shaft about the first axis, the central actuator positioned at a center of rotation of the rotor assembly;
the first gear assembly to convert the first rotation into a plurality of second rotations of a plurality of second shafts including the second drive shaft, each of the second shafts to provide torque to blades coupled to the rotor assembly;
carriers, each carrier coupled to a respective one of the second shafts;
the first planetary gear system is disposed in at least one of the carriers;
the second planetary gear system is disposed in at least one of the carriers; and
the output shaft is coupled to the second planetary gear system to provide the torque to at least one of the blades.

19. The apparatus as defined in claim 18, further comprising pitch shafts, a sun gear of the first planetary gear system being coupled to at least one of the pitch shafts.

* * * * *